United States Patent
Weiss et al.

(10) Patent No.: US 9,677,731 B2
(45) Date of Patent: Jun. 13, 2017

(54) MOTOR VEHICLE ACCENT LAMP AND METHODS OF USE THEREOF

(71) Applicants: Blair Weiss, Peterborough, NH (US); Jason Lessard, Bow, NH (US); Richard Holland, Stoddard, NH (US); Craig Landcastle, Bow, NH (US)

(72) Inventors: Blair Weiss, Peterborough, NH (US); Jason Lessard, Bow, NH (US); Richard Holland, Stoddard, NH (US); Craig Landcastle, Bow, NH (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 122 days.

(21) Appl. No.: 14/700,435

(22) Filed: Apr. 30, 2015

(65) Prior Publication Data
US 2016/0320010 A1    Nov. 3, 2016

(51) Int. Cl.
*F21S 8/10*    (2006.01)
*B60Q 1/00*    (2006.01)
(Continued)

(52) U.S. Cl.
CPC ........ *F21S 48/1104* (2013.01); *B60Q 1/0058* (2013.01); *B60Q 1/2615* (2013.01);
(Continued)

(58) Field of Classification Search
CPC .. F21S 48/1104; F21S 48/115; F21S 48/1208; F21S 48/1305; F21S 48/211;
(Continued)

(56) References Cited

U.S. PATENT DOCUMENTS

| 5,685,637 A | 11/1997 | Chapman et al. |
| 5,984,494 A | 11/1999 | Chapman et al. |

(Continued)

FOREIGN PATENT DOCUMENTS

| CN | 101619829 | 1/2010 |
| DE | 202 07 799 U1 | 8/2002 |

(Continued)

OTHER PUBLICATIONS

English Abstract of CN 101619829-A obtained from Espacenet website on Nov. 11, 2015 (2 pages).
(Continued)

*Primary Examiner* — Sean Gramling
*Assistant Examiner* — Gerald J Sufleta, II
(74) *Attorney, Agent, or Firm* — Edward S. Podszus

(57) ABSTRACT

A method of providing accent ornamental illumination to a lamp of a motor vehicle comprising providing an accent lamp comprising a housing and a light-emitting device disposed within the housing; mounting the housing to an exterior surface of the lens cover of the vehicle lamp; and arranging the light-emitting device such that, when the housing is mounted to the exterior surface of the lens cover of the lamp, light emitted from the light-emitting device passes through the lens cover from outside the lens cover towards a lamp reflector of the vehicle lamp and illuminates the reflector. A motor vehicle lamp combination comprising, in combination, a motor vehicle lamp and an accent lamp also provided wherein, when the accent lamp is mounted on a lens cover of the motor vehicle lamp, light emitted from the light-emitting device is directed towards the reflector.

20 Claims, 8 Drawing Sheets

(51) Int. Cl.
  *B60Q 1/26*       (2006.01)
  *F21Y 101/02*     (2006.01)
(52) U.S. Cl.
  CPC ......... *F21S 48/115* (2013.01); *F21S 48/1208* (2013.01); *F21S 48/1305* (2013.01); *F21S 48/211* (2013.01); *F21S 48/212* (2013.01); *F21S 48/215* (2013.01); *F21S 48/328* (2013.01); *B60Q 2900/10* (2013.01); *F21Y 2101/02* (2013.01)
(58) Field of Classification Search
  CPC .... F21S 48/212; F21S 48/215; F21S 48/1159; F21S 48/1995; B60Q 1/0058; B60Q 1/2615
  USPC .................................................. 362/459–549
  See application file for complete search history.

(56) References Cited

U.S. PATENT DOCUMENTS

| | | | |
|---|---|---|---|
| 6,652,122 B2 | 11/2003 | Lin | |
| D488,584 S * | 4/2004 | Tsai | D26/139 |
| 6,717,376 B2 | 4/2004 | Lys et al. | |
| 6,756,893 B1 | 6/2004 | Fernandez | |
| 6,909,239 B2 | 6/2005 | Gauna | |
| 7,008,096 B1 | 3/2006 | Coushaine et al. | |
| 7,055,991 B2 | 6/2006 | Lin | |
| 7,160,012 B2 | 1/2007 | Hilscher et al. | |
| 7,261,451 B2 | 8/2007 | Coushaine et al. | |
| 7,525,254 B2 | 4/2009 | Lys et al. | |
| 7,566,142 B2 | 7/2009 | Wesson | |
| 8,021,028 B2 | 9/2011 | Riesebosch | |
| 8,491,148 B2 | 7/2013 | Coushaine et al. | |
| 2004/0264187 A1 | 12/2004 | Vanderschuit | |
| 2005/0036333 A1* | 2/2005 | Van Duyn | B60Q 1/0052 362/539 |
| 2006/0203502 A1 | 9/2006 | Stevens et al. | |
| 2007/0076426 A1 | 4/2007 | Kling et al. | |
| 2008/0224843 A1 | 9/2008 | Overline | |
| 2009/0154186 A1* | 6/2009 | Natsume | B60Q 1/0041 362/516 |
| 2009/0175047 A1* | 7/2009 | Tsai | B60Q 1/0041 362/487 |
| 2010/0032971 A1* | 2/2010 | Stoffel | B60Q 1/0433 293/155 |
| 2011/0175719 A1 | 7/2011 | Ford | |
| 2012/0099326 A1 | 4/2012 | Hammond et al. | |
| 2013/0170240 A1 | 7/2013 | Ballatan et al. | |
| 2014/0063832 A1* | 3/2014 | Lin | B60Q 1/0035 362/518 |
| 2014/0268852 A1* | 9/2014 | Foley | F21S 48/00 362/520 |
| 2014/0293637 A1* | 10/2014 | Datz | B60Q 1/2696 362/521 |
| 2015/0224919 A1* | 8/2015 | Sobecki | B60Q 1/2615 353/13 |

FOREIGN PATENT DOCUMENTS

| | | |
|---|---|---|
| DE | 10 2007 018 985 A1 | 10/2008 |
| JP | 2006092922 | 4/2006 |
| WO | 2009011562 A2 | 1/2009 |
| WO | 2010030336 A1 | 3/2010 |

OTHER PUBLICATIONS

Machine translation of JP 2006-092922 (Pub. Date Jun. 4, 2006) obtained from website astamuse.com (18 pages, unnumbered).
Abstract (1 pg.) in English from espacenet.com of German application DE 10 2007 018 985 (Ruths), also attached to above Ruths '985 (Ruths '985 identified in Jan. 16, 2017 Search Report in counterpart German utility model No. 20 2016 300 651.8).
Abstract (1 pg.) in English (via mach. transl.) of German utility model DE 202 07 799 U1 (FER Fahrzeugelektrik), also attached to above FER '799 (FER '799 identified in Search Report of Jan. 16, 2017 in counterpart German utility model No. 20 2016 000 651.8).

* cited by examiner

MOTOR VEHICLE ACCENT LAMP AND METHODS OF USE THEREOF

FIELD

The present disclosure relates to an accent (ornamental or auxiliary) lamp and lighting apparatus, particularly for use with a motor vehicle.

BACKGROUND AND ACKNOWLEDGED PRIOR ART

To customize a motor vehicle's lighting, hobbyists may add aftermarket lighting to the vehicle. With regards to motor vehicle aftermarket add-on lamps, certain light emitting diode (LED) lamps are available as individual colored light sources, or as LED halo rings commercially available in the United States as aftermarket automotive parts for automotive enthusiasts to install in conventional headlamps, such as a product marketed under the trade name Flashtech for 7" sealed beam headlamps, such as for the Jeep® vehicle, and similar aftermarket LED halo rings available from the Lumen Company for multi-compartment headlamps having conventional low and high beam lamps. It is understood, such as from tutorials available on the internet (e.g. "YouTube" website) that, in order to install these aftermarket LED lamps or halo rings, the vehicle owner in general must perform a variety of complicated steps that include to remove the headlamp from the vehicle; heat the headlamp such as in an oven or with a heat gun to soften the sealed connection between the lens cover and reflector; remove the lens cover from the headlamp in order to expose the reflector; choose a correctly-sized LED halo ring to fit the reflector pocket; secure the LED lamp or halo ring to the now-exposed reflector using adhesive, or in the case of larger multi-compartment headlamps, to carefully cut a mounting slot for the LED halo ring in the reflector with a grinding wheel; route electric power supply wires into the reflector by puncturing the vent patch over the pre-existing vent hole or by drilling a hole in the reflector, either of which approach risks creating a source of water entry; replace the lens cover over the reflector and attempt to replicate the factory pre-assembled connection to seal out humidity and dirt using a silicone sealant; and then remount the headlamp to the vehicle.

These are complicated steps requiring tools, mechanical skill, entail the risk of damaging the factory pre-set headlamps, and are inconvenient to average consumers.

Known LED halo lamps such as those sold under the designation Flashtech are available with an external driver which is mounted on the vehicle outside of the headlamp and is replaceable separate from the halo ring inside the headlamp. A 24 key infrared (IR) wireless RGB remote control module permits choice of colors, including white, as well as blending and fade.

SUMMARY

In order to provide a simple and customized appearance to existing motor vehicle lighting, the present disclosure improves upon the lighting apparatus of motor vehicles, such as by emitting chromatic (colored) light from the headlamps of the motor vehicle.

In one embodiment, a method of providing accent or auxiliary ornamental illumination to a lamp of a motor vehicle is provided by the present disclosure. The term auxiliary in the context of the ornamental lamp preferably connotes a lamp not subject to regulatory requirements. The lamp of the motor vehicle may include a reflector, a lens cover that covers the reflector, and a primary light source disposed within the reflector in optical cooperation with the reflector, with the reflector positioned to receive light and direct received light outward through the lens cover forming an illumination pattern, wherein the lens cover has an interior surface directed towards the reflector and an exterior surface directed outwardly opposite the reflector. The method of providing accent ornamental illumination comprises providing an accent lamp comprising a housing and a light-emitting device disposed within the housing, the housing defining a mounting surface adapted to mount to a portion of the lens cover of the vehicle lamp; mounting the housing to the exterior surface of the lens cover of the vehicle lamp; and arranging the light-emitting device such that, when the housing is mounted to the exterior surface of the lens cover of the vehicle lamp, light emitted from the light-emitting device passes through the lens cover from outside the lens cover towards the lamp reflector and illuminates the reflector.

In another embodiment, a motor vehicle lamp combination is provided by the present disclosure. The motor vehicle lamp combination may comprise, in combination, a motor vehicle lamp having a reflector, a lens cover that covers the reflector, and a primary light source disposed within the reflector in optical cooperation with the reflector, the reflector positioned to receive light and direct received light outward through the lens cover forming an illumination pattern, wherein the lens cover has an interior surface directed towards the reflector and an exterior surface directed outwardly opposite the reflector; and an accent lamp comprising a housing and a light-emitting device disposed within the housing, the housing further defining a mounting surface adapted to mount to a portion of the lens cover and further defining a light exit aperture configured to permit light from the light-emitting device to exit the housing in a direction of the mounting surface. The mounting surface of the housing is selectably mountable to the exterior surface of the lens cover, and, when the accent lamp is mounted on the lens cover, light emitted from the light-emitting device is directed towards the reflector.

BRIEF DESCRIPTION OF FIGURES

The above-mentioned and other features of this disclosure, and the manner of attaining them, will become more apparent and better understood by reference to the following description of embodiments described herein taken in conjunction with the accompanying drawings, wherein.

DETAILED DESCRIPTION INCLUDING BEST MODE OF A PREFERRED EMBODIMENT

Figure 1:
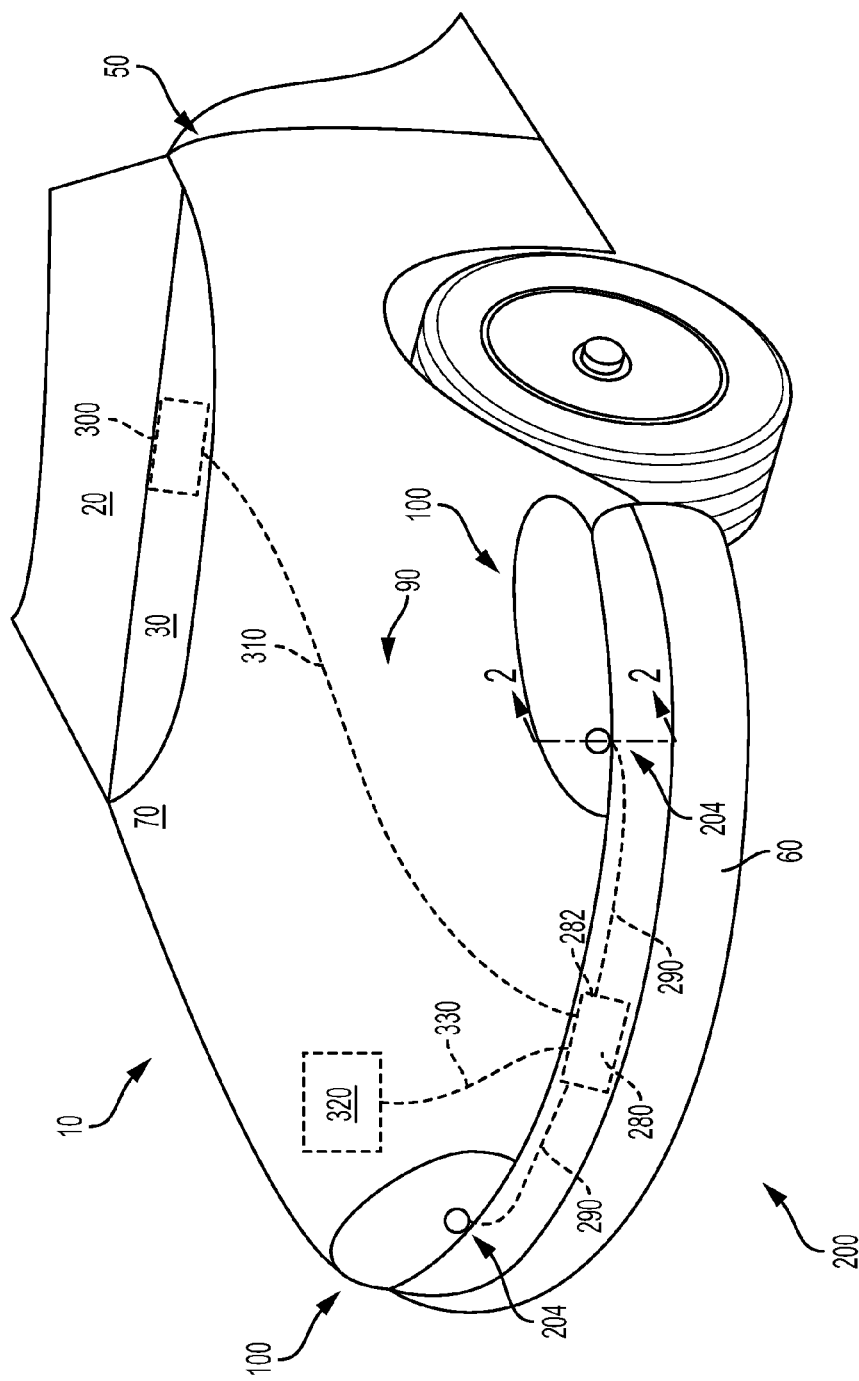
FIG. 1 is a perspective view of a motor vehicle 10 including a lamp 100, and more particularly a headlamp, which includes one embodiment of an accent lighting apparatus 200, particularly an accent lamp 204, according to the present disclosure.

It may be appreciated that the present disclosure is not limited in its application to the details of construction and the arrangement of components set forth in the following description or illustrated in the drawings. The embodiments herein may be capable of being practiced or being carried out in various ways. Also, it may be appreciated that the phraseology and terminology used herein is for the purpose of description and should not be regarded as limiting as such may be understood by one of skill in the art.

Referring to FIG. 1, there is shown a motor vehicle 10 including a lamp 100, particularly in the form of a headlamp. The motor vehicle 10 may include, but is not limited to, a land vehicle such as a passenger sedan, a sport utility vehicle, a minivan, a truck (light or heavy truck) and a recreational vehicle (e.g., ATV, motorcycle, snowmobile). Motor vehicle 10 may also include water vehicles (e.g. boats, jet-skis, personal water craft) and air vehicles (e.g. planes, helicopters).

Figure 2:
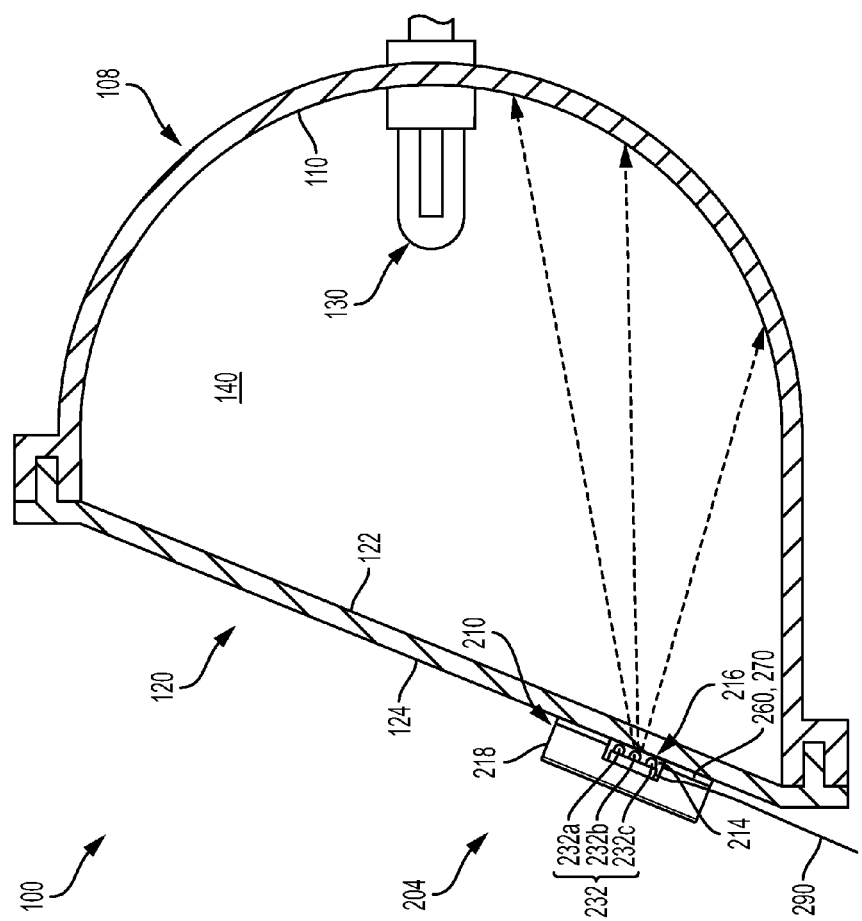
FIG. 2 is a cross sectional side view of the headlamp 100 of the motor vehicle 10 of FIG. 1, taken along line 2-2.

Referring to FIG. 2, headlamp 100 may comprise a housing 108, reflector 110, an outer lens cover 120 (transparent or translucent) and an internal light source 130, which may be understood to provide achromatic (white) light. Achromatic light may be understood to be light which is color neutral to the naked human eye. Housing 108 and lens cover 120 may be coupled along their peripheral edges in a manner known in the art.

Vehicle lamp light source 130 may be contained within the confines of the headlamp 100, particularly in a cavity 140 formed between the inner surface 122 of lens cover 120 and the housing 108. The light source 130 may be removably fastened to the housing 108 which is, in turn, removably fastened to the motor vehicle 10 in a known manner, The motor vehicle lamp light source 130 may comprise one or more incandescent bulbs, light-emitting diodes (LEDs) or a combination thereof, disposed within the reflector 110 in optical cooperation with the reflector 110. The reflector 110 may be positioned to directly receive light from the light source 130 and direct received light outward through the lens cover 120 forming at least one illumination pattern (e.g. low beam illumination pattern and a high beam illumination pattern), which may be understood as the primary light source to provide the primary illumination for motor vehicle 10. Each of the low and high beam illumination patterns may be provided at least in part by reflecting light from light source 130 off the concave (primary) reflector 110 of the housing 108, and thereafter passing the reflected light through the lens cover 120 to provide illumination. The lens cover 120 may or may not redirect (e.g. converge) the light passing there through. The achromatic light emitted from light source 130 may be at an intensity suitable for headlamp 100 during night time operation of motor vehicle 10.

As shown in FIGS. 1-4, in order to provide accent or auxiliary illumination to the motor vehicle 10, an accent lighting apparatus 200 may be incorporated with the lighting system 90 of the motor vehicle 10. Accent lighting apparatus 200 may include a headlamp attachment in the form of at least one accent lamp 204 configured to be arranged adjacent an exterior surface 124 of the lens cover 120 of headlamp 100. Accent lighting apparatus 200 may also be understood to provide accent illumination from the headlamps 100, particularly supplemental ornamental lighting, which may be understood to be lighting provided from the headlamps 100 alternate to or different from the lighting provided from the headlamps 100 at the time of manufacture of the motor vehicle 10.

In certain embodiments, the accent lamp(s) 204 may be fastened to the lens cover 120 of the headlamp 100 by an adhesive bond. It may be desirable to use an adhesive bond, such as with a thermoplastic adhesive, where the user desires to make the accent lamp(s) 204 detachable from the headlamp 100 without damage to the lens cover 120 of the headlamp 100. If adhesive residue remains on the lens cover 120 after removal of the accent lamp(s) 204, it is removable with a general purpose cleaner or a suitable solvent.

The accent lamp(s) 204 may be configured to emit chromatic (colored) light, particularly having a wavelength in a range of 400 nm to 700 nm (nanometers), more preferably in a range of about 400 nm to about 630 nm. Chromatic (colored) light may be understood to be light which is not color neutral to the naked human eye. The chromatic (colored) light may be either monochromatic or polychromatic.

Figure 5:
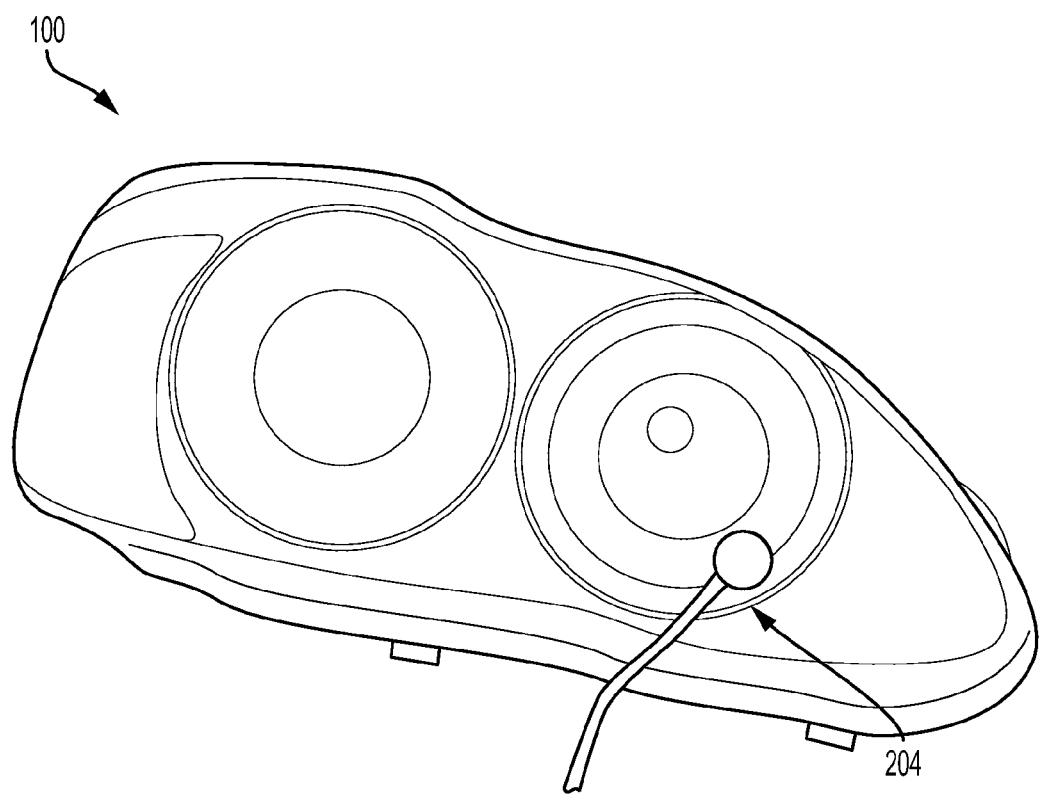
FIG. 5 is a close-up front view of one of the headlamps 100 of the motor vehicle 10 of FIG. 1 including the accent lamp 204 shown in FIGS. 3-4.

As shown by FIG. 1, at least one accent lamp 204 may be located on each headlamp 100 of motor vehicle 10. More particularly, as shown by FIG. 5, the accent lamp(s) 204 may be located in front of each high beam portion of each headlamp 100 of motor vehicle 10. However, it should be understood that the accent lamp(s) 204 may be located in front of each low beam portion of each headlamp 100 of motor vehicle 10; or that the accent lamp(s) 204 may be located in front of each low beam portion of each headlamp 100 as well as each high beam portion of each headlamp 100 of motor vehicle 10; or located between the high beam and low beam reflector portion of each headlamp 100. When attached to a headlamp 100, accent lamp(s) 204 may cover approximately 2 $cm^2$ to 8 $cm^2$ of lens cover 120 of headlamp 100, more particularly cover about 5 $cm^2$ (about the size of a United States 25-cent coin known as a quarter-dollar) thereof, and not significantly interfere with operation of the low and high beams of the headlamp 100, particularly as the chromatic (colored) light there from is not in the direct trajectory of the main forward lighting of the headlamp 100.

Figure 4:
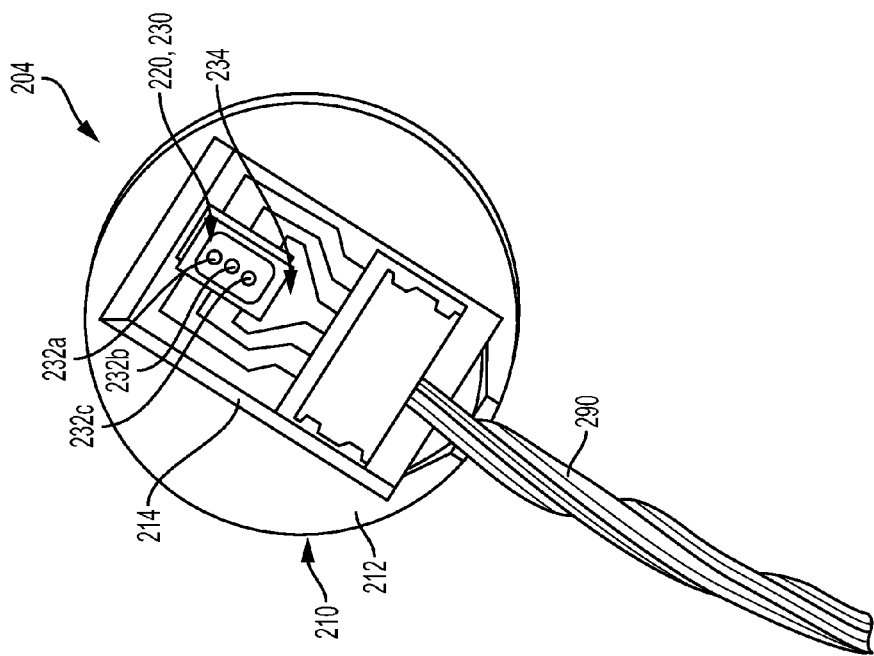
FIG. 4 is a rear perspective view of the accent lamp 204 shown in FIG. 3.
Figure 3:
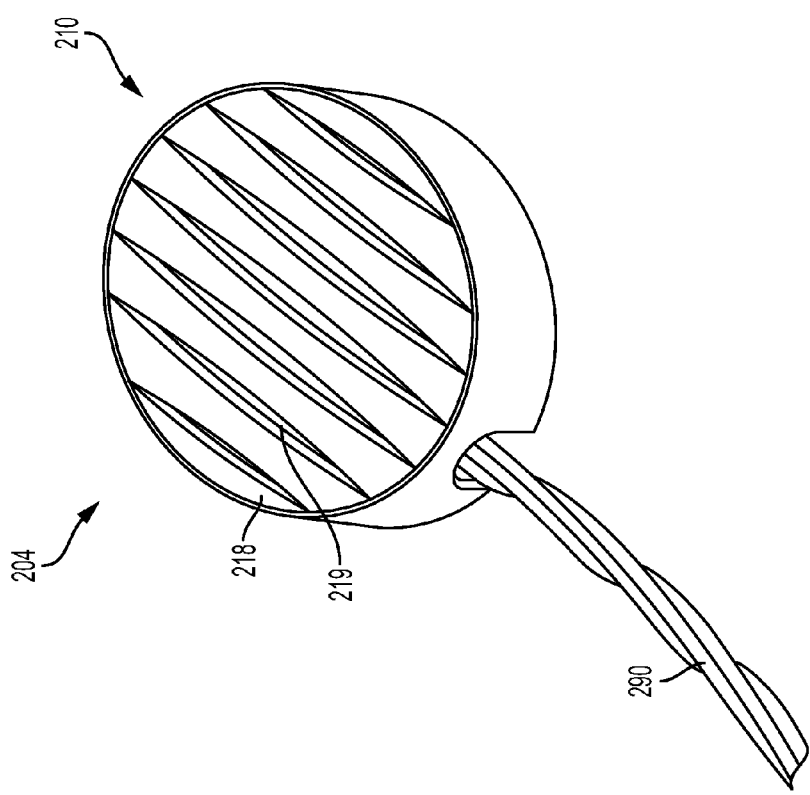
FIG. 3 is a front perspective view of the accent lamp 204 of the accent lighting apparatus 200 of FIG. 1 according to an embodiment of the present disclosure.

As best shown in FIG. 4, accent lamp(s) 204 may comprise at least one light-emitting device 220 coupled to a housing 210. More particular, the at least one light-emitting device 220 is disposed within the housing 210. Housing 210 may include an inner mounting surface 212 adapted to contact a portion of the lens cover 120, particularly to mount accent lamp 204 to the exterior surface 124 of lens cover 120 of headlamp 100.

The mounting surface 212 of the housing 210 is selectably mountable to the exterior surface 124 of the lens cover 120. For example, the inner mounting surface 212 of the housing 210 may be bonded to the exterior surface 124 of lens cover 120 particularly by use of an adhesive member 260, which may comprise a thermoplastic or thermosetting pressure sensitive adhesive layer. The pressure sensitive adhesive layer may be applied to opposing sides of a foam (cellular) tape carrier 270, and thereafter the opposing sides of the foam tape 270 coated with the pressure sensitive adhesive 260 may be bonded to the inner mounting surface 212 of the housing 210 and the exterior surface 124 of lens cover 120, respectively.

Referring to FIG. 2 and FIG. 4, the light-emitting device 220 may be particularly arranged in the housing 210, such that when the housing 210 of accent lamp 204 is mounted to the lens cover 120 of headlamp 100, light emitted from the light-emitting device 220 of the accent lamp 204 is directed rearward (relative to the motor vehicle 10) through the lens cover 120 (i.e. from outside of the lens cover 120 to inside the headlamp 100, and not away from the motor vehicle 10) and reflected on the concave reflector 110 of the housing 108 of the headlamp 100, in which case the light may illuminate the reflector 110 and be subsequently redirected by the reflector 110 such that the reflected light passes back through the lens cover 120 (i.e. from inside the headlamp 100 to outside of the headlamp 100).

In certain embodiments, light-emitting device 220 may comprise a light generating source 230, which may include at least one light-emitting diode (LED) 232, and may further comprise a plurality of LEDs 232a, 232b, 232c. More particularly, LED 232a may comprise a red LED, LED 232b may comprise a green LED, and LED 232c may comprise a blue LED. Within the electromagnetic spectrum, red LED 232a may operate at a wavelength ($\lambda$) in a range of 620 nm to 700 nm, and even more particularly in a range of 620 nm to 645 nm. Green LED 232b may operate at a wavelength ($\lambda$) in a range of 500 nm to 570 nm, and more particularly in a range of 520 nm to 550 nm. Blue LED 232c may operate at a frequency in a range of 450 nm to 500 nm, and more particularly in a range of 460 nm to 490 nm. While discrete red, green and blue LED chips can be used, other chip packages contain all three dies bonded into one chip; RGBW (white) and RGBA (amber) chip combinations can also be used to enhance control.

With regards to maximum intensity, the maximum light intensity emitted from light-emitting device 220, and more particularly the light generating source 230, of each accent lamp 204 is configured to be lower than the light intensity emitted from the low beam or high beam of headlamp 100. For example, a light source 130 for headlamp 100 such as a an HB1/9004 halogen headlamp bulb is designed to emit about 700 lumens on low beam and about 1200 lumens on high beam. In contrast, the maximum light intensity emitted from light-emitting device 220 of each accent lamp 204 is configured to be less than or equal to 300 lumens. For example, the light intensity emitted from light-emitting device 220 may range of 5 lumens to 300 lumens, and more particularly in a range of 20 lumens to 250 lumens, and even more particularly in a range of 40 lumens to 100 lumens.

The LEDs 232a, 232b and 232c may be arranged as part of one or more light engines 234, which may comprise an LED driver including a printed circuit board (PCB) to which the LED 232a, 232b and 232c are mounted as well as the electrical wiring to provide a signal to the LEDs 232a, 232b and 232c on color and intensity. The LED driver can be mounted on a PCB separate from the PCB on which the LEDs are mounted, or mounted on the same PCB with the LEDs.

As shown, RGB LED light engine 234 may be located in a connector-like receptacle 214 located in the housing 210. Also as shown, the housing 210 also defines a light exit aperture 216, which is shown to be defined by the inner mounting surface 212 of the housing 210, configured to permit light from the light-emitting device 220 to exit the housing 120 in a direction of the mounting surface 212 and pass through the lens cover 120 of the headlamp 100 towards the reflector 110, while the remainder of the housing 210 inhibits light emitted directly from the light-emitting device to be emitted forward of the motor vehicle 10.

Heat from the light-emitting device 220 may be transferred to and otherwise managed by the housing 210, which may be formed of metal. The exterior surface 218 of the housing 210 may include a plurality of heat sink fins 219 to dissipate heat from the light-emitting device 220. Such heat sink fins are not required if housing surface 218 has sufficient thermal communication to dissipate heat without fins.

Accent lighting apparatus 200 may further comprise a power supply 280 to supply power to the accent lamp(s) 204, which may be electrically coupled thereto by electrical wiring 290. In addition, accent lighting apparatus 200 may further comprise a controller 300 electrically coupled to the power supply 280 by electrically wiring 310. Among other things, controller 300 may be used to control the power output emitted from the power supply 280, particularly based on input received from a user of the accent lighting apparatus 200. As shown controller 300 may be located in the passenger compartment 20 of motor vehicle 10, such as located on the instrument panel 30.

The power supply 280 may receive power from a power source 320 (e.g. a car battery) which is electrically coupled thereto by electrical wiring 330. The power supply 280 may further comprise a housing 282 containing a constant current power supply for exciting the LED chips. The output of the power supply 280 to the accent lamp(s) 204 may be controlled by a feedback loop which includes a sense resistor, which may be located in the accent lamp(s) 204, or any other suitable location.

In certain embodiments of the present disclosure, the controller 300 and/or the power source 320 may be included in the power supply 280, particularly within the housing 282. Moreover, in certain other embodiments, the power supply 280, controller 300 and/or the power source 320 may each be included in housing 210, in which case most or all electrical wiring 290, 310 and 330 may be eliminated from the accent lighting apparatus 200.

In certain embodiments of the present disclosure, the controller 300 may be a wireless controller configured to receive input (control) signals from a wireless transmitter. The wireless transmitter may comprise computer programming operable on a micro-computer, such as may be provided by a radio, laptop computer, a tablet computer or a smart (cell) phone. The wireless controller 300 and wireless transmitter may communicate wirelessly using Wi-Fi® technology or Bluetooth® technology or other suitable wireless communication technology.

The computer programming may be provided in the form of a computer software application which operates on the micro-computer. The computer software may provide a graphical user interface (GUI) which enables the user to select a color and intensity of chromatic (colored) light to be emitted from the accent lighting apparatus 200. Software may run on the receiving end, receiving from the GUI computer, which in turn commands the intensity of each color through a constant current driver circuit.

For example, the graphical user interface may enable the user to select a color from a display of available colors provided on a color palette which enables the user to select a color of the chromatic (colored) light to be emitted from the accent lighting apparatus 200. The color palette may make use of an RGB color model. The RGB model may be understood as an additive color model in which red, green, and blue light from the LEDs 232*a*, 232*b* and 232*c* are combined together in various levels to reproduce a broad array of colors. The RGB model may be a true color model which provides, for example, at least 256 shades of red, green and blue for a total of at least 16 million color variations.

The graphical user interface may also enable the user to enter a specific value for each of the red, green and blue shades between 0 and 255 as known in the art, which may be in addition to or alternatively to the color palette. The graphical user interface may also enable the user to enter specific values for HSL (hue-saturation-lightness) and HSV (hue-saturation-value), which may be understood as the two most common cylindrical-coordinate representations of the points in the RGB color model.

In addition to color, the graphical user interface may also enable the user to adjust the output intensity of accent lighting apparatus 200 between full intensity and a fraction of full intensity. For example, the graphical user interface may enable the user to adjust the output intensity of accent lighting apparatus 200 based on a percentage of full intensity ranging from zero (off) to 100% (full on) in 1% point increments. Use of an 8-bit controller permits adjustment close to $\frac{1}{255}$ or nearly 0.5% increments. Thus, for example the graphical user interface may enable the user to adjust the output intensity of accent lighting apparatus 200 at 10%, 20%, 30%, 40%, 50%, 60%, 70%, 80%, 90% and 100% of output intensity.

The color and intensity of the illumination emitted from the accent lamp(s) 204 may be derived using pulse width modulation on the red LED 232*a*, green LED 232*b* and the blue LED 232*c* in a manner known in the art.

The chromatic (colored) light provided by accent lamp(s) 204 may be pre-set to a non-adjustable wavelength during manufacture of the accent lighting apparatus 200 or, more preferably, may be adjustable in the field by the user of the accent lighting apparatus 200 to provide a multitude of programmable lighting wavelengths as desired by a user of the accent lighting apparatus 200 to provide various lighting effects.

The light generating source 230 of accent lamp(s) 204, and particularly LEDs 232*a*, 232*b*, 232*c*, may be configured to operate alone or in combination to emit virtually any shade of chromatic (colored) light in the visible light portion (visible to the naked human eye) of the electromagnetic spectrum. In particular, the light generating source 230, and particularly LEDs 232*a*, 232*b*, 232*c* may be used to emit light with a wavelength in the range of 400-450 nm (violet), 450-495 nm (blue), 495-570 nm (green), 570-590 nm (yellow), 590-620 nm (orange) and 620-700 nm (red).

In use, chromatic (colored) light from the accent lamp(s) 204 located in front of each high beam of each headlamp 100 of motor vehicle 10 may be emitted from the accent lamp(s) 204 during the day, or after dusk (at night) when headlamp 100 is in use. At night, the chromatic (colored) light from the accent lamp(s) 204 located in front of each high beam of each headlamp 100 may be particularly apparent when the high beam illumination of the headlamp 100 is off, during which time the low beam illumination may be in use. Thereafter, when the light beam illumination is in use, the chromatic (colored) light from the accent lamp(s) 204 may be washed out by the intensity of the high beam illumination and not be visible to other motorists.

Figure 7:
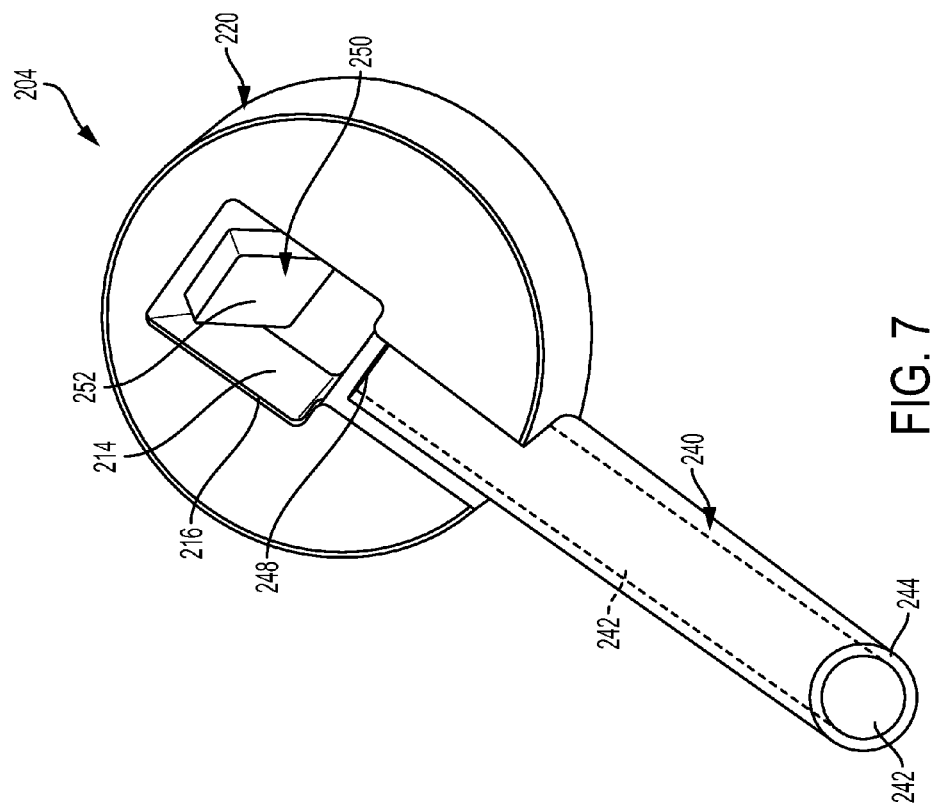
FIG. 7 is a rear perspective view of the accent lamp 204 shown in FIG. 6.
Figure 6:
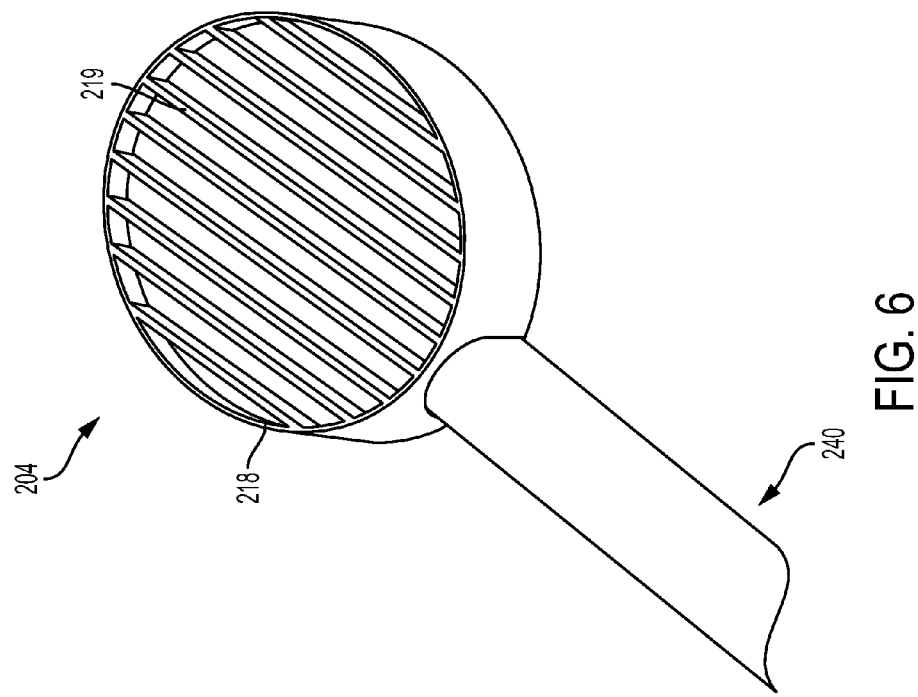
FIG. 6 is a front perspective view of the accent lamp 204 of the accent lighting apparatus 200 of FIG. 1 according to another embodiment of the present disclosure.

In another embodiment of the present disclosure, as shown in FIGS. 6-7, the light generating source 230 may be removed from the accent lamp(s) 204. As shown, light-emitting device 220 may comprise a light transmission cable 240 and a reflector 250. The light transmission cable 240 may comprise a tubular light guide 242 which may be contained in an opaque outer sheath 244, and may be either a hollow structure that contains the light with a reflective lining, or a transparent solid that contains light by total internal reflection.

Figure 8:
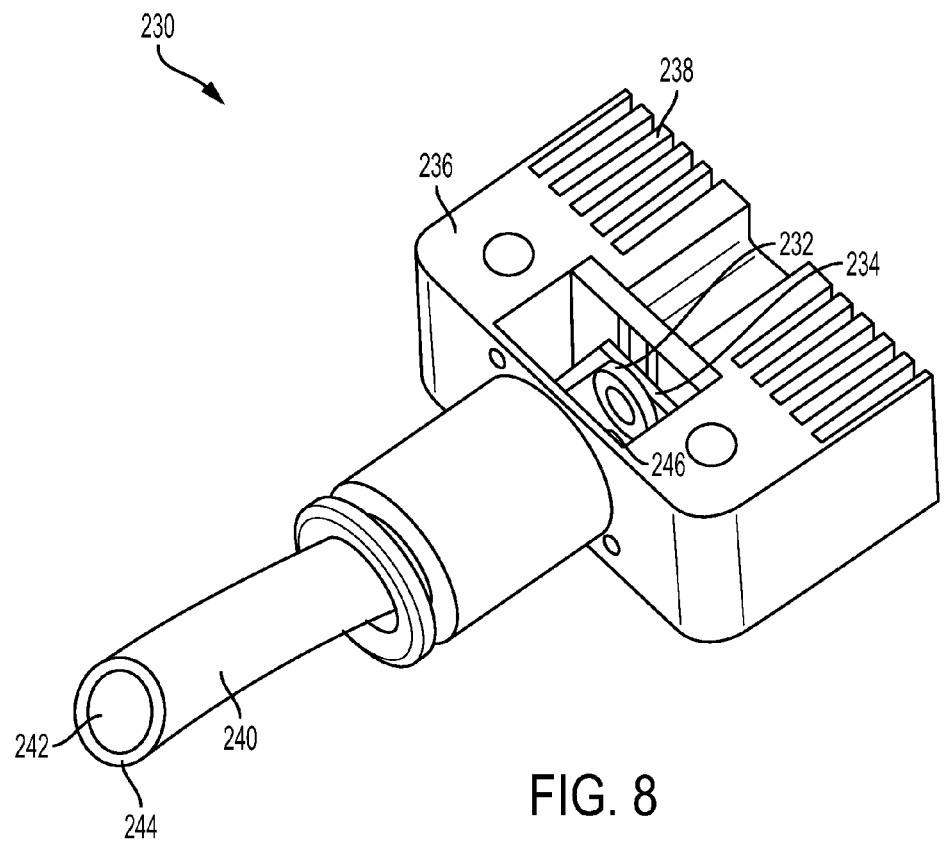
FIG. 8 is a perspective view of an embodiment of a light generating source 230, of the accent lighting apparatus 200 according to the present disclosure.
Figure 9:
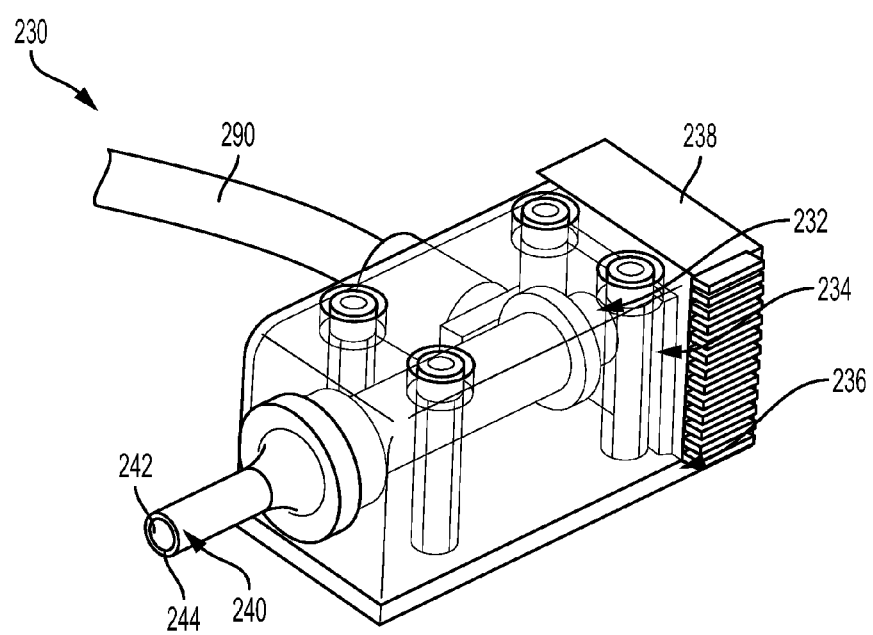
FIG. 9 is a perspective view of another embodiment of a light generating source 230 of the accent lighting apparatus 200 according to the present disclosure.
Figure 10:
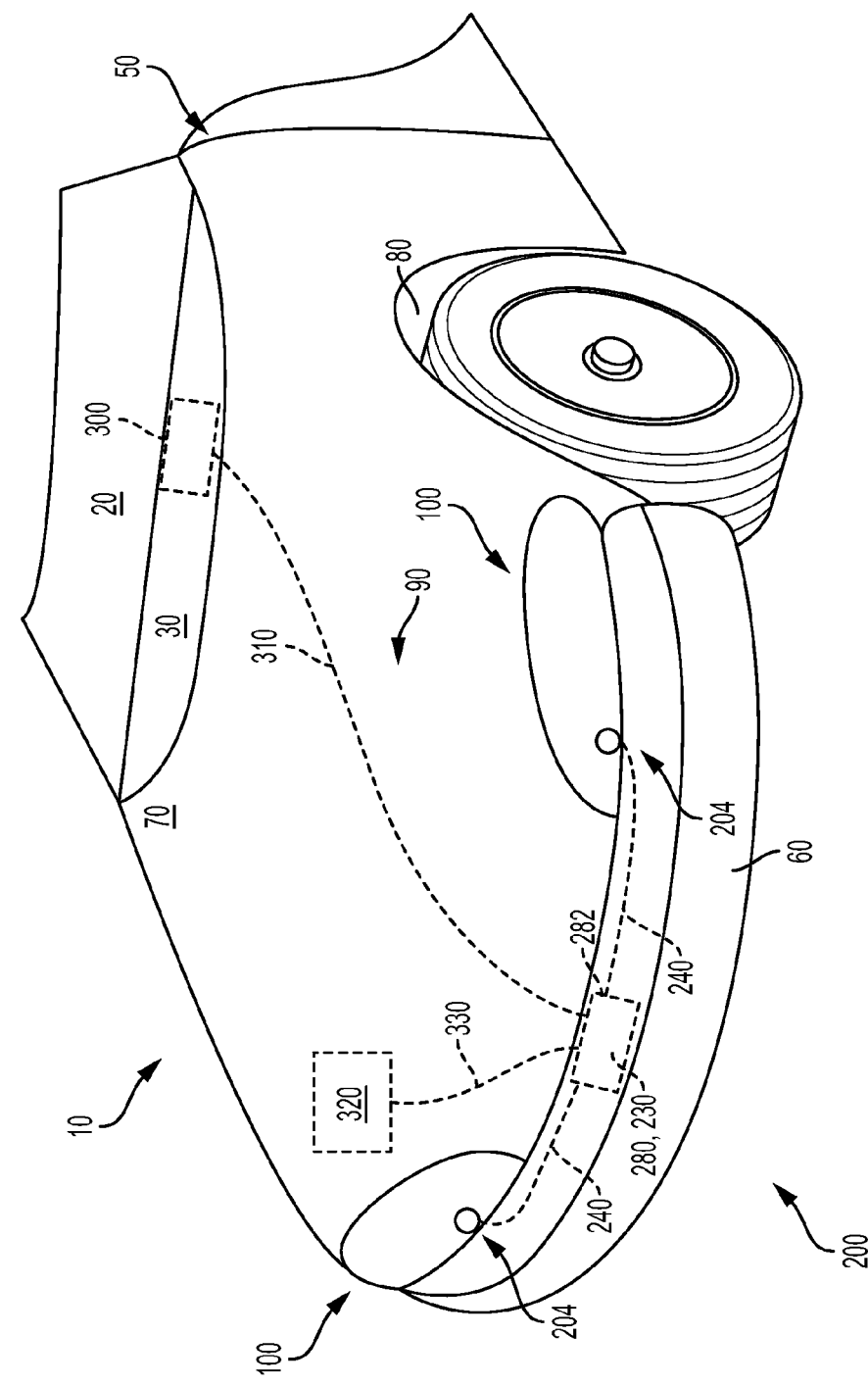
FIG. 10 is a perspective view of a motor vehicle 10 including a headlamp 100 which includes another embodiment of an accent lighting apparatus 200 according to the present disclosure.

At the opposing end, as shown in FIGS. 7-8, the light transmission cable 240 may be coupled to a light generating source 230. Light generating source 230 may include at least one light-emitting diode (LED) 232, which may further comprise a plurality of LEDs 232*a*, 232*b*, 232*c* as shown in the first embodiment. Also similar to the first embodiment, LEDs 232*a*, 232*b* and 232*c* may be arranged as part of one or more light engines 234, which may comprise an LED driver including a printed circuit board (PCB) to which the LED 232*a*, 232*b* and 232*c* are mounted as well as the electrical wiring to provide signal to the LEDs 232*a*, 232*b* and 232*c* on color and intensity. Also similar to the first embodiment, the light generating source 230 may be contained in a housing 236 which acts as a heat sink and includes heat sink fins 238. As shown in FIG. 10, to reduce the number of separate parts, light generating source 230 may be located within power supply 280. However, the light generating source 230 may also be provided as a discrete unit.

As shown in FIG. 7, the at least one LED 232 may be arranged such that chromatic (colored) light generated there from may enter a terminal end 246 of tubular light guide 242 and thereafter be transmitted therein to the opposing terminal end 248. Upon reaching terminal end 248, the colored light within tubular light guide 242 may exit the light guide 242 and thereafter reflect on the reflector surface 252 of reflector 250. The chromatic (colored) light may then be directed through the lens cover 120 (i.e. from outside of the lens cover 120 to inside the headlamp 100) and reflected on the concave reflector 110 of the housing 108 of the headlamp 108, in which case the light may illuminate the reflector 110 and be subsequently redirected by the reflector (110) such that the reflected light passes back through the lens cover 120 (i.e. from inside the headlamp 100 to outside of the headlamp 100).

FIG. 8 shows another embodiment of the light generating source 230, with the elements thereof provided in a different arrangement.

Figure 11:
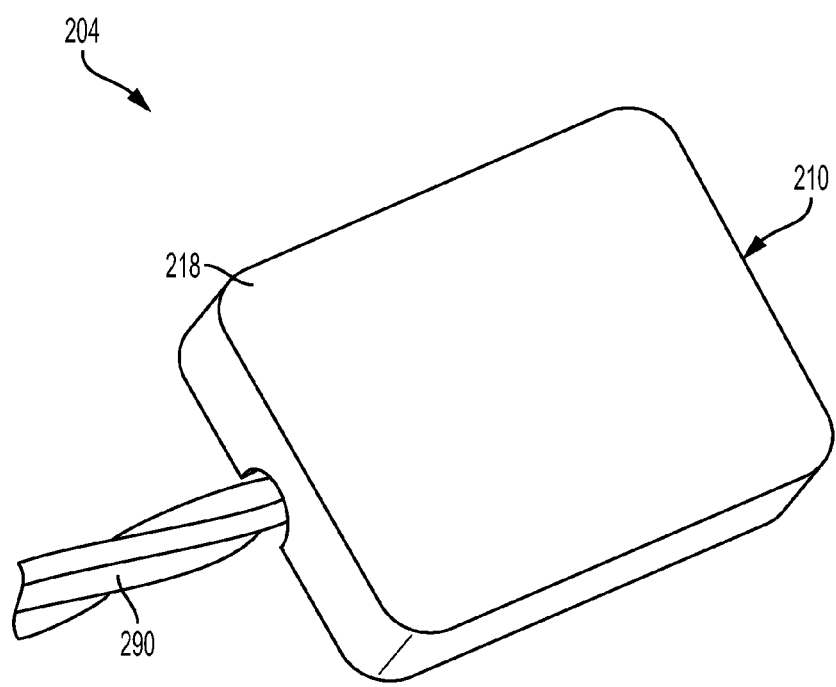
FIG. 11 is a front perspective view of an accent lamp 204 according to another embodiment of the present disclosure.

While FIGS. 3-4 and FIGS. 6-7 show accent lamp 204 to have a teardrop and a circular shape respectively, it should be understood that the accent lamp 204 may have virtually any shape. For example, as shown in FIG. 11, the accent lamp 204 may have a rectangular shape.

In other embodiments of the present disclosure, the accent lamp(s) 204 may be configured to emit achromatic (white) light, such as for use as daytime running lights. Also, in other embodiments of the present disclosure, the accent lamp(s) 204 may be mountable on side-lamps (marker lamps, signal lamps) or tail-lamps as opposed to headlamps.

All the components of the accent lighting apparatus 200, except for the accent lamp(s) 204 and possibly a portion of electrical wiring 290 or light transmission cable 240 may be hidden from view by the motor vehicle 10. For example, the power supply 280 may the concealed from view beneath the exterior body 50 of the motor vehicle 10. For example, the power supply 280 may be concealed beneath the front-end 60 of the motor vehicle 10, particularly between the fascia and the front-end support structure (e.g. radiator frame). In other embodiments, the power supply 280 may be located beneath the hood 70, particularly in the engine compartment, and wired through an opening in the front-end support structure. In other embodiments, the power supply 280 may be located within the passenger compartment 20 of the motor vehicle 10, such as in a storage compartment or beneath the instrument panel 30, and wired through the firewall.

Also, with regards to power source 320, the power source 320 does not have to be provided by the battery of the motor vehicle 10. For example, the power source 320 may be provided by the alternator of the motor vehicle 10, which can supply current when the vehicle motor is running. Furthermore, it should be understood that the power source 320 need not necessarily be provided by the motor vehicle 10. For example, the accent lighting apparatus 200 may have its own dedicated power source 320, which may comprise one or more replaceable or rechargeable batteries electrically coupled to light generating source 230. In such instance, the power source 320 may be included with the power supply 280 as a singular unit, and the power source 320 or power supply 280 may also include a manual on-off switch.

While a preferred embodiment of the present disclosure has been described, it should be understood that various changes, adaptations and modifications can be made therein without departing from the spirit of the disclosure and the scope of the appended claims. The scope of the disclosure should, therefore, be determined not with reference to the above description, but instead should be determined with reference to the appended claims along with their full scope of equivalents. Furthermore, it should be understood that the appended claims do not necessarily comprise the broadest scope of the disclosure which the applicant is entitled to claim, or the only manner in which the disclosure may be claimed, or that all recited features are necessary.

NON-LIMITING LIST OF REFERENCE CHARACTERS USED HEREIN 10 motor vehicle
20 passenger compartment
30 instrument panel
50 exterior body
60 front-end
70 hood
90 lighting system (motor vehicle)
100 lamp/headlamp
108 housing
110 reflector
120 lens cover
122 lens cover interior surface
124 lens cover exterior surface
130 lamp light source
140 cavity
200 accent lighting apparatus
204 accent lamp
210 housing
212 housing inner mounting surface
214 housing receptacle
216 light exit aperture
218 housing exterior surface
219 housing heat sink fins
220 light-emitting device
230 light generating source
232 light-emitting diodes (232a, 232b, 232c)
234 light-emitting diode light engine
236 housing
238 heat sink fins
240 light transmission cable
242 tubular light guide
244 tubular outer sheath
246 terminal end of tubular light guide
248 terminal end of tubular light guide
250 reflector
252 reflector surface
260 adhesive member
270 foam tape
280 power supply
282 housing
290 electrical wiring
300 controller
310 electrical wiring
320 power source
330 electrical wiring

What is claimed is:

1. A method of providing ornamental illumination to a lamp (100) of a motor vehicle (10), the lamp (100) having a reflector (110), a lens cover (120) that covers the reflector (110), and a primary light source (130) disposed within the reflector (110) in optical cooperation with the reflector (110), the reflector (110) positioned to receive light and direct received light outward through the lens cover (120) forming an illumination pattern, wherein the lens cover (120) has an interior surface (122) directed towards the reflector (110) and an exterior surface (124) directed outwardly opposite the reflector (110), the method comprising:
providing an accent lamp (204) comprising a housing (210) and a light-emitting device (220) disposed within the housing (210), the housing (210) defining a mounting surface (212) adapted to mount to a portion of the lens cover (120);
mounting the housing (210) to the exterior surface (124) of the lens cover (120) of the vehicle lamp (100); and
arranging the light-emitting device (220) such that, when the housing (210) is mounted to the exterior surface (124) of the lens cover (120) of the lamp (100), light emitted from the light-emitting device (220) passes through the lens cover (120) from outside the lens cover (120) towards the lamp reflector (110) and illuminates the reflector (110).

2. The method of claim 1 wherein:
mounting the housing (210) to the exterior surface (124) of the lens cover (120) of the vehicle lamp (100) further comprises mounting the housing (210) to the exterior surface (124) of the lens cover (120) of the vehicle lamp (100) with an adhesive.

3. The method of claim 1 further comprising:
adjusting at least one of a color of the light and an intensity of the light to be provided from the light-emitting device (220).

4. The method of claim 1 wherein:
the light-emitting device (220) comprises at least one light-emitting diode (232) within the housing (210).

5. The method of claim 1 wherein:
the light-emitting device (220) emits chromatic light having a wavelength in a range of 400 nanometers to 700 nanometers.

6. The method of claim 1 wherein:
the light-emitting device (220) has a light intensity of 5 lumens to 300 lumens.

7. The method of claim 1 wherein:
the housing (210) includes at least one light exit aperture (216) through which the light emitted from the at least one light-emitting device (220) passes before the light passes through the lens cover (120).

8. The method of claim 1 wherein:
the housing (210) inhibits light emitted directly from the light-emitting device (220) to be emitted forward of the motor vehicle (10).

9. A motor vehicle lamp combination comprising, in combination:
a motor vehicle lamp (100) having a reflector (110), a lens cover (120) that covers the reflector (110), and a primary light source (130) disposed within the reflector (110) in optical cooperation with the reflector (110), the reflector (110) positioned to receive light and direct received light outward through the lens cover (120) forming an illumination pattern, wherein the lens cover (120) has an interior surface (122) directed towards the reflector (110) and an exterior surface (124) directed outwardly opposite the reflector (110); and
an accent lamp (204) comprising a housing (210) and a light-emitting device (220) disposed within the housing (210), the housing (210) further defining a mounting surface (212) adapted to mount to a portion of the lens cover (120) and further defining a light exit aperture (216) configured to permit light from the light-emitting device (220) to exit the housing (120) in a direction of the mounting surface;
the mounting surface (212) of the housing (210) being selectably mountable to the exterior surface (124) of the lens cover (120); and
wherein, when the accent lamp (204) is mounted on the lens cover (120), light emitted from the light-emitting device (220) is directed towards the reflector (110).

10. The motor vehicle lamp combination of claim 9 wherein:
the light-emitting device (220) comprises at least one light-emitting diode (232) within the housing (210).

11. The motor vehicle lamp combination of claim 9 wherein:
the light-emitting device (220) emits chromatic light having a wavelength in a range of 400 nanometers to 700 nanometers.

12. The motor vehicle lamp combination of claim 9 wherein:
the light-emitting device (220) has a light intensity of 5 lumens to 300 lumens.

13. The motor vehicle lamp combination of claim 9 wherein:
the housing (210) inhibits light emitted directly from the light-emitting device (220) to be emitted forward of the motor vehicle (10).

14. The motor vehicle lamp combination of claim 9 wherein:
the mounting surface (212) includes an adhesive.

15. The motor vehicle lamp combination of claim 9 further comprising:
a controller (300) coupled to a power supply (280) to adjust at least one of a light color and a light intensity provided from the light-emitting device (220).

16. The motor vehicle lamp combination of claim 15 wherein:
the controller (300) comprises a wireless controller configured to receive input control signals from a wireless transmitter.

17. The motor vehicle lamp combination of claim 9 wherein:
the light-emitting device (220) comprise at least one light-emitting diode (232) and a tubular light guide (242);
the tubular light guide (242) comprises a first terminal end (246) and a second terminal end (248);
the first terminal end (246) of the tubular light guide (242) is located remote from the housing (210) and provides a light entrance of the tubular light guide (242) for light from the at least one light-emitting diode (232); and
the second terminal end (248) of the tubular light guide (242) is located within the housing (210) and provides a light exit of the tubular light guide (242) for the light from the at least one light-emitting diode (232).

18. A motor vehicle accent lamp (204) mountable to a motor vehicle lamp (100) having a reflector (110) covered by a lens cover (120), said accent lamp (204) comprising:
a housing (210) and a light-emitting device (220) disposed within the housing (210),
the housing (210) defining a mounting surface (212) adapted to mount to a portion of a lens cover (120) of a motor vehicle lamp (100);
the housing (210) further defining a light exit aperture (216) configured to permit light from the light-emitting device (220) to exit the housing (120) in a direction of the mounting surface (212);
the mounting surface (212) of the housing (210) having an adhesive and being selectably mountable to the exterior surface (124) of the lens cover (120); and
wherein, when the accent lamp (204) is adhesively mounted on the lens cover (120), light emitted from the light-emitting device (220) is directed into the motor vehicle lamp (100) towards the reflector (110).

19. The motor vehicle accent lamp (204) of claim 18 wherein:
the light-emitting device (220) comprises at least one light-emitting diode (232) within the housing (210).

20. The motor vehicle accent lamp (204) of claim 18 wherein:
the housing (210) inhibits light emitted directly from the light-emitting device (220) to be emitted from the housing (210) in a direction other than through the light exit aperture (216) facing in the direction of the mounting surface (212).

* * * * *